United States Patent [19]
Zehrung

[11] Patent Number: 5,727,960
[45] Date of Patent: *Mar. 17, 1998

[54] HINGE FOR PASSING POWER

[76] Inventor: Raymond E. Zehrung, 3029 Cameron Way, Santa Clara, Calif. 95051

[21] Appl. No.: 623,171

[*] Notice: The term of this patent shall not extend beyond the expiration date of Pat. No. 5,586,895.

[22] Filed: Mar. 28, 1996

Related U.S. Application Data

[63] Continuation-in-part of Ser. No. 546,586, Oct. 23, 1995, Pat. No. 5,586,895.
[51] Int. Cl.⁶ .................................................. H01R 35/04
[52] U.S. Cl. ........................................... 439/165; 16/223
[58] Field of Search ........................... 16/223; 439/31, 439/165

[56] References Cited

U.S. PATENT DOCUMENTS

| | | |
|---|---|---|
| 2,298,692 | 10/1942 | Giles . |
| 3,102,654 | 9/1963 | Millman et al. . |
| 3,103,398 | 9/1963 | Phelps . |
| 3,355,695 | 11/1967 | Overesch . |
| 3,428,738 | 2/1969 | Zychal . |
| 3,848,361 | 11/1974 | Foster et al. . |
| 3,857,625 | 12/1974 | Crane et al. . |
| 3,911,622 | 10/1975 | Prohaska . |
| 4,116,514 | 9/1978 | Lawrence ................................. 16/223 |
| 4,140,357 | 2/1979 | Wolz et al. ................................. 439/31 |
| 4,412,711 | 11/1983 | Suska . |
| 4,839,939 | 6/1989 | O'Brien, II . |
| 5,141,446 | 8/1992 | Ozouf et al. . |
| 5,329,433 | 7/1994 | Geeting et al. . |

*Primary Examiner*—Gary F. Paumen
*Attorney, Agent, or Firm*—David R. Gildea

[57] ABSTRACT

A hinge for transferring power between a wall jamb and a door. The hinge includes a pair of hinge leaves having interleaved knuckles axially aligned to share a common bore and engaged to allow the door to rotate. At least one cable enters a recess in a rear surface of one hinge leaf, passes through a longitudinal passageway in the hinge leaf, across the common bore, through a longitudinal passageway in the other hinge leaf, and exits a recess in the rear surface of the other hinge leaf. The passageways are aligned or accessible from the common bore and have tapered openings to enable the cable to be routed or fished after the hinge is mechanically assembled.

20 Claims, 7 Drawing Sheets

Fig_1

Fig_2

Fig_4

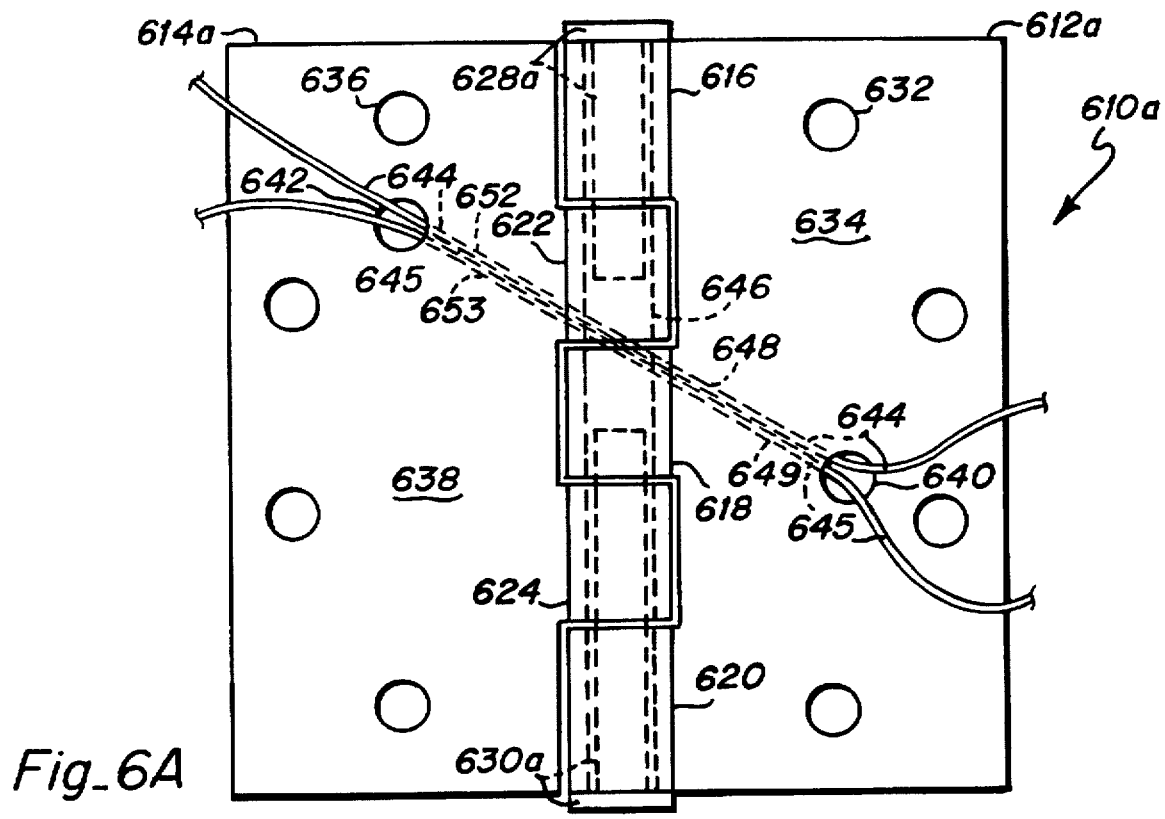
Fig_6A
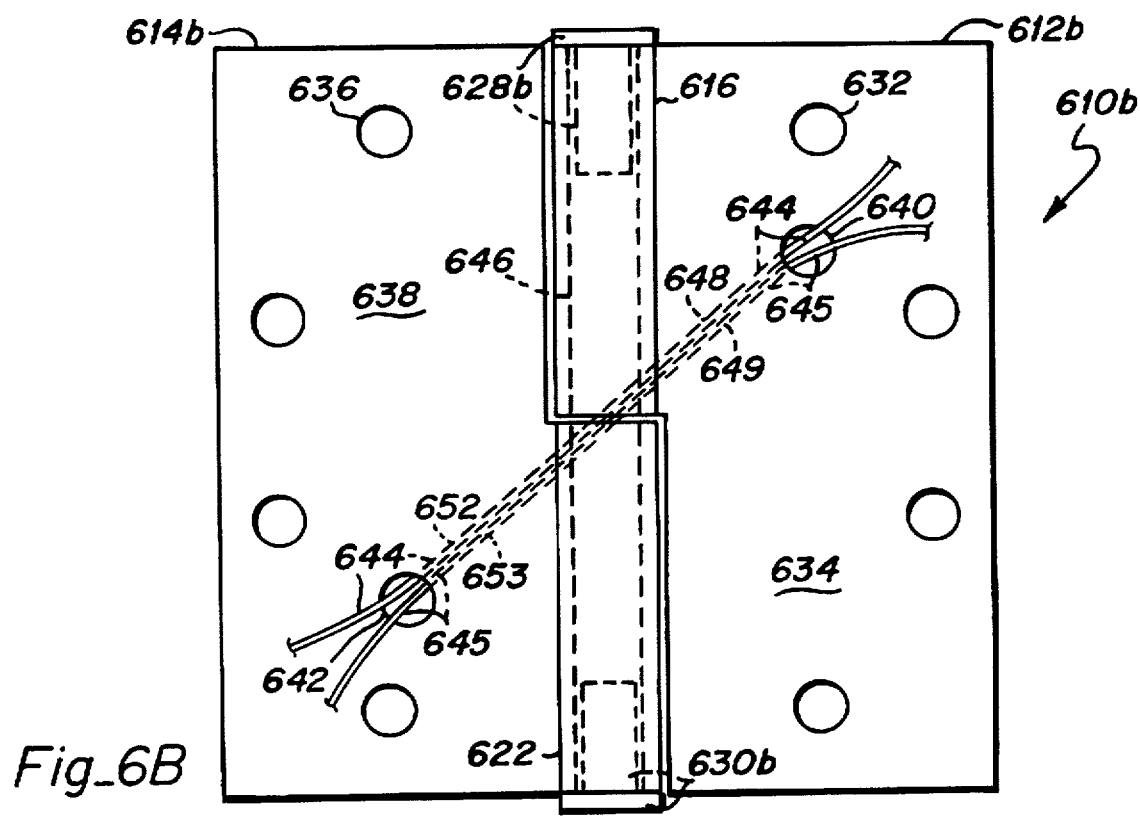
Fig_6B

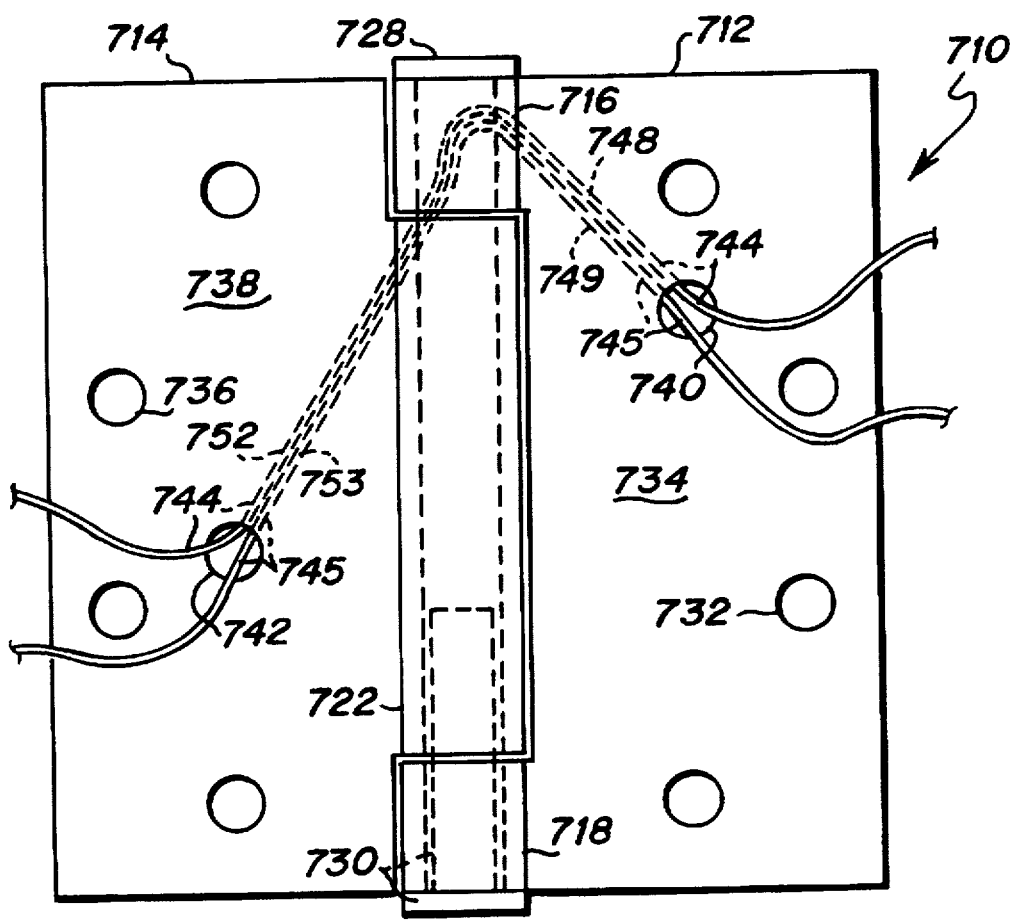
Fig_7

HINGE FOR PASSING POWER

CONTINUATION-IN-PART

This application is a Continuation-in-Part of Ser. No. 08/546,586 filed on Oct. 23, 1995 now U.S. Pat. No. 5,586,895.

BACKGROUND OF THE INVENTION

1. Field of the Invention

The invention relates generally to hinges and more particularly to a door hinge for passing power or a signal between a wall to a door.

2. Description of the Prior Art

A number of applications exist for a power transfer hinge to pass an electrical current from a wall to a pivotable door or window. Examples of such applications are electrically operated door locks, card-key door locks, door locks that automatically release the door in the event of a fire, door locks that are controllable from a remote location, and door-mounted lights. Several hinge constructions having wires for passing the electrical current have been tried. Preferably the wires are concealed within the hinge to be protected from damage or tampering and the hinge is load bearing to carry the weight of the door. In the known constructions having concealed wires, the wires are routed through longitudinal conduits in plate-like hinge leaves. One figure of merit for a power transfer hinge is the amount of electrical current that can be passed through the wires. However, because it is not desirable for the hinge leaves to be overly thick, the size of the wires in the cable and therefore the current that can be passed through the hinge is limited.

Zychal discloses a hinge for electrically connecting two housings in U.S. Pat. No. 3,428,738 entitled "hinge with conductors passing therethrough". The Zychal hinge comprises a U-shaped hinge plate and an inner hinge plate disposed longitudinally within the U. A wire cable is routed from recesses in each leg of the U-shaped plate to a recess in the inner plate through a longitudinal channel along an axis about which pivoting occurs. The housings are structurally connected for pivoting by two separate load-bearing hinges. Zychal does not teach the details of a load bearing hinge and the Zychal hinge is not intended or suitable for supporting a door.

Crane et al. in U.S. Pat. No. 3,857,625, Suska in U.S. Pat. No. 4,412,711, and O'Brien, II in U.S. Pat. No. 4,839,939 disclose hinges having wires entering an opening in the rear of a first hinge leaf, passing through a longitudinal conduit in the first leaf, passing upwardly or downwardly through bores in knuckles of the first and a second hinge leaf along the pivot axis of the hinge, passing through a second longitudinal conduit in the second hinge leaf, and exiting out an opening in the second hinge leaf. Unlike, Zyehal, each of these hinges is intended to be load bearing, however, the constructions require several specialized parts and machining operations and are relatively complex and costly compared to a standard door hinge. Further, the hinges must be partially or entirely disassembled to insert or remove the wires, thereby making the hinge more difficult to repair if a wire breaks.

Several commercial products are available that comprise a standard door hinge that has been modified to pass a wire cable upwardly or downwardly through the bores of the hinge knuckles and outwardly through longitudinal passageways in the hinge leaves. The wire cable then exits to the door jam and wall jamb through recesses in the rear of the hinge leaves. The longitudinal passageways are gun drilled from the outside edge of the hinge leaves through the recesses to the bores of the hinge knuckles. Two conducting wires are required in order to make a complete electrical circuit for an electrical application device in the door. However, four wires are typically used to more closely approximate a circular cross-section of the longitudinal passageways to increase the amount of electrical current that can be carried and to facilitate the routing of the wire cable. For a commercial application, these products have the potential benefits being easy to install because they fit a standard door and wall jamb and of low cost due to the high manufacturing volume of the standard door hinges. However, all known commercial products require expensive machining operations for modifying the standard hinges and must be disassembled to replace the wire cable if the wires break.

There is a need for a load-bearing power transfer hinge that uses a concealed electrical cable for passing electricity from a wall to a door that carries the maximum electrical current, is relatively simple and inexpensive to construct, and can be repaired without disassembly.

SUMMARY OF THE INVENTION

It is therefore an object of the present invention to provide a load-bearing power transfer hinge that is simple and inexpensive to construct that uses a concealed cable for passing power or a signal from a wall to a door.

Another object is to provide a power transfer hinge using a coaxial electrical cable for increasing the amount of electrical current that can be passed through a power transfer hinge.

Another object is to provide a power transfer hinge through which a cable may be routed without mechanically disassembling the hinge.

Another object is to provide a power transfer hinge having longitudinal passageways having a common center line and tapered openings through a common bore about which the hinge pivots in order to allow a cable to be fished without mechanically disassembling the hinge.

Another object is to provide a power transfer hinge having the shortest longitudinal passageways for a standard location for entry recesses in the hinge, thereby simplifying an operation for constructing the passageways.

Briefly, in a preferred embodiment, the power transfer hinge includes a first hinge leaf having two or more first knuckles and a second hinge leaf having two or more second knuckles interleaved with the first knuckles and axially aligned to share a common bore. The power transfer hinge pivots about an upper and a lower pin disposed in the common bore. The first hinge leaf and the second hinge leaf have a rear entry recess and longitudinal passageway. A coaxial electrical cable enters one recess; passes through one passageway, the common bore, and the other passageway; and exits the other recess. The passageways share a common line and have tapered openings into the common bore to facilitate routing the cable after the hinge is mechanically assembled.

In another preferred embodiment, the power transfer hinge includes a right leaf having at least one knuckle and a left leaf having at least one knuckle where the knuckles from the right and left leaves are interleaved and forming a common bore. The hinge pivots about a lower pin and an upper pin or end cap. One or more longitudinal passageways are made from the common bore into the edge of each leaf to communicate with a recess in the rear surface of that leaf. A cable is routed into one recess, through the hinge and out of the other recess. Alternatively, the cable is routed from the common bore outwardly through each leaf and out of each recess.

An advantage of the present invention is that the power transfer hinge for passing power or signal has a low manufacturing cost because its construction uses simple and inexpensive manufacturing operations.

Another advantage of the present invention is that the power transfer hinge uses a coaxial electrical cable, thereby increasing the electrical current that can be passed without enlarging the diameter of the longitudinal passageways in the hinge leaves.

Another advantage of the power transfer hinge of the present invention is that a cable may be fished after assembly of the hinge without disassembling the hinge, thereby facilitating the manufacturer and/or repair of the hinge.

Another advantage of the present invention is that the cable in the power transfer hinge is routed through passageways that have a common center line and tapered openings through a common bore about which the hinge pivots, thereby allowing a cable to be fished without mechanically disassembling the hinge.

Another advantage of the present invention is that the passageways in the power transfer hinge are as short as possible for a standard door preparation, thereby simplifying construction and reducing the likelihood that a passageways will break one of the surfaces of the hinge leaves.

These and other objects and advantages of the present invention will no doubt become obvious to those of ordinary skill in the art after having read the following detailed description of the preferred embodiments which are illustrated in the various figures.

IN THE DRAWINGS

FIGS. 6a and 6b are rear views of power transfer hinges having five and two knuckles, respectively, and two power conducting cables; and FIG. 7 is a rear view of a power transfer hinge having three knuckles and two power conducting cables.

DETAILED DESCRIPTION OF THE PREFERRED EMBODIMENTS

Figure 1:
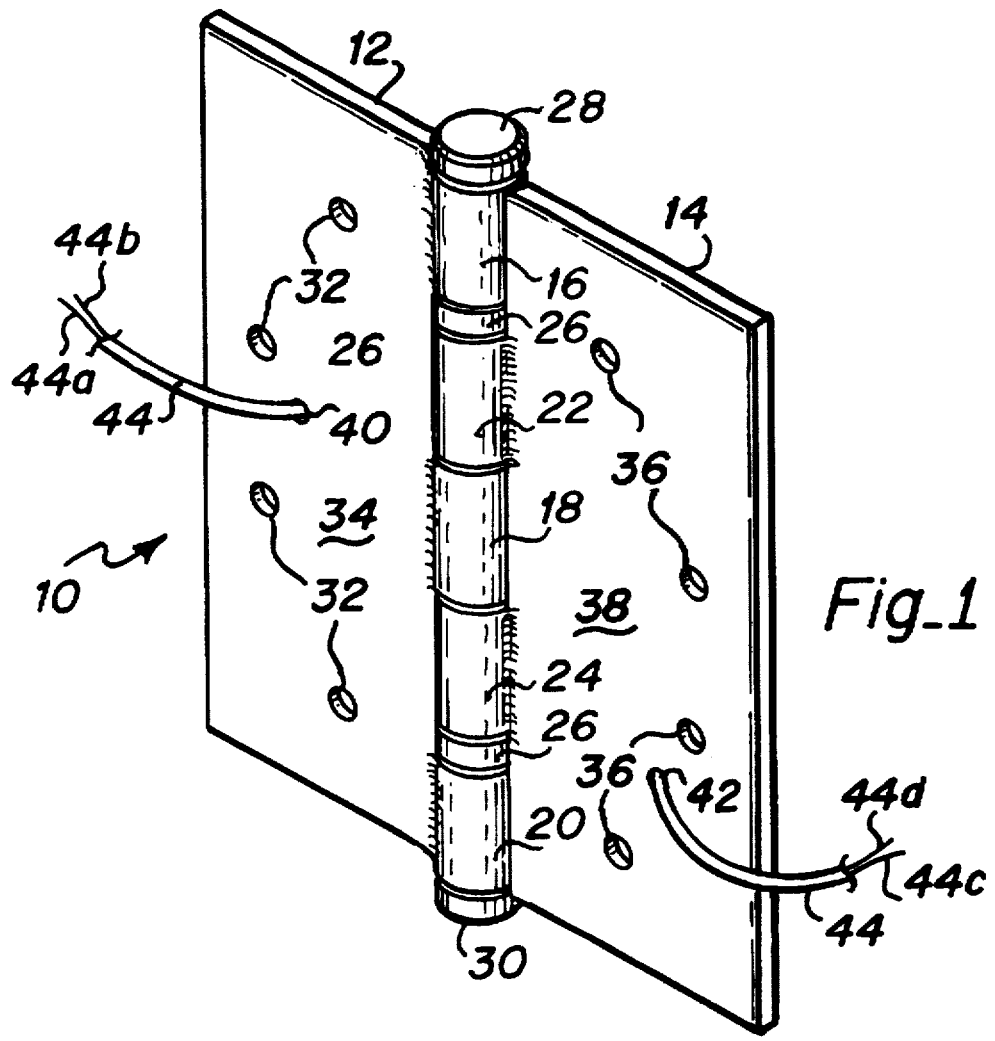
FIG. 1 is a three dimensional rear view of a power transfer hinge of the present invention.

FIG. 1 illustrates a three dimensional view of the rear side of the power transfer hinge of the present invention referred to herein by the general reference number 10. The hinge 10 includes a first hinge leaf 12 including a first upper knuckle 16, a first middle knuckle 18, and a first lower knuckle 20; and a second hinge leaf 14 including a second upper knuckle 22 and a second lower knuckle 24. The second upper knuckle 22 is interleaved between the first upper knuckle 16 and the first middle knuckle 18 and the second lower knuckle 24 is interleaved between the first middle knuckle 18 and the first lower knuckle 20. In a preferred embodiment, an upper portion of the second upper knuckle 22 and a lower portion of the second lower knuckle 24 include a ball race 26. An upper pin 28 having an enlarged head extends downwardly through a bore in the first upper knuckle 16 and a lower pin 30 having an enlarged head extends upwardly through a bore in the first lower knuckle 20. The upper pin 28 and the lower pin 30 are staked to the first upper knuckle 16 and the first lower knuckle 20, respectively. In operation, the first and second hinge leaves 12 and 14 pivot about the vertical axis of the upper and lower pins 28 and 30. Fastening holes 32 are used for fastening the rear surface 34 of the first hinge leaf 12 to a door or wall jamb. Similarly, fastening holes 36 are used for fastening the rear surface 38 of the second hinge leaf 14 to an opposed door or wall jamb. The hinge 10 may be used in any orientation including vertically with the upper pin 28 up, vertically with the upper pin 28 down, horizontally, or at an angle. Although a preferred embodiment has five knuckles 16, 18, 20, 22, and 24, a number of knuckles of four or more may be used.

The rear surface 34 of the first hinge leaf 12 includes a recess 40. Similarly, the rear surface 38 of the second hinge leaf 14 includes a recess 42. A cable 44 exits the hinge 10 at the recess 40 and at the recess 42. In a preferred embodiment, the recess 40 is located to mate with a standard door preparation known as "Stanley" and the recess 42 is located to mate with another standard door preparation known as "McKinney." The cable 44 is an electrical coaxial cable 44 having inner and outer conductors. Optionally, the inner and outer conductors are electrically connected to wires 44a, 44b, 44c, and 44d in order to connect into an electrical system. Alternatively, the cable 44 may comprise one or more separate electrical wires and/or optical conductors.

Figure 2:
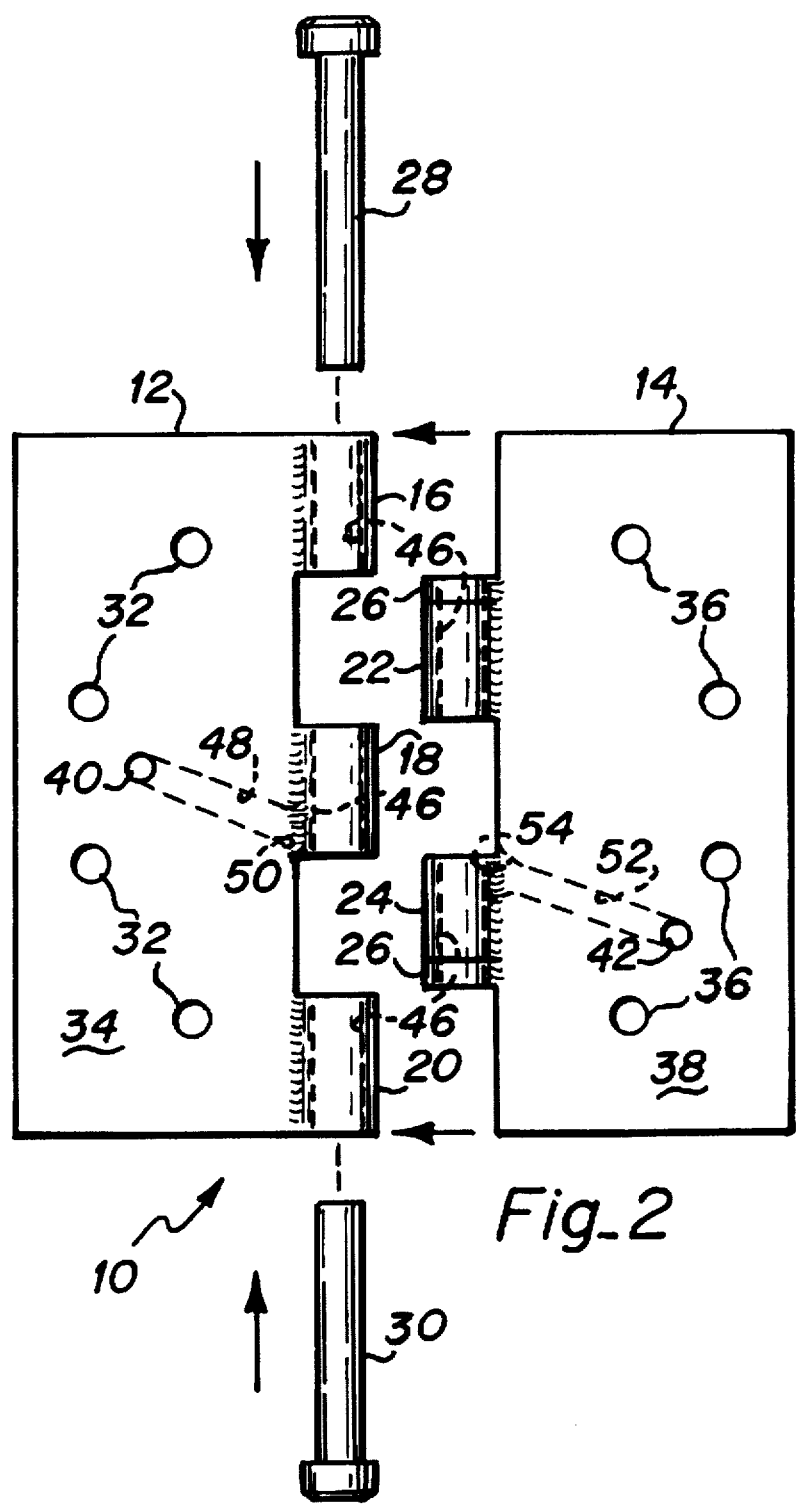
FIG. 2 is an exploded view of the hinge of FIG. 1.

FIG. 2 illustrates an exploded rear view of the power transfer hinge 10 showing the first hinge leaf 12 including the rear surface 34 and the fastening holes 32 and the second leaf 14 showing the rear surface 38 and the fastening holes 36. Each of the knuckles 16, 18, 20, 22, and 24 includes a knuckle bore. When the hinge 10 is assembled, each of the knuckle bores is axially aligned to form a common bore 46. The upper pin 28 inserts through the bores of the first upper knuckle 16 and the second upper knuckle 22 and part way into the bore of the first middle knuckle 18 and the lower pin 30 inserts through the bore of the first lower knuckle 20 and part way into the bore of the second lower knuckle 24. A first longitudinal passageway 48 enters the common bore 46 through a tapered opening 50 and connects the common bore 46 to the recess 40. Similarly, a second longitudinal passageway 52 having a tapered opening 54 connects the common bore 46 to the recess 42. The first and second passageways 48 and 52 are made so that their entries into the common bore 46 have a common center line 56 (FIG. 4) when the hinge 10 is assembled.

Figure 3:
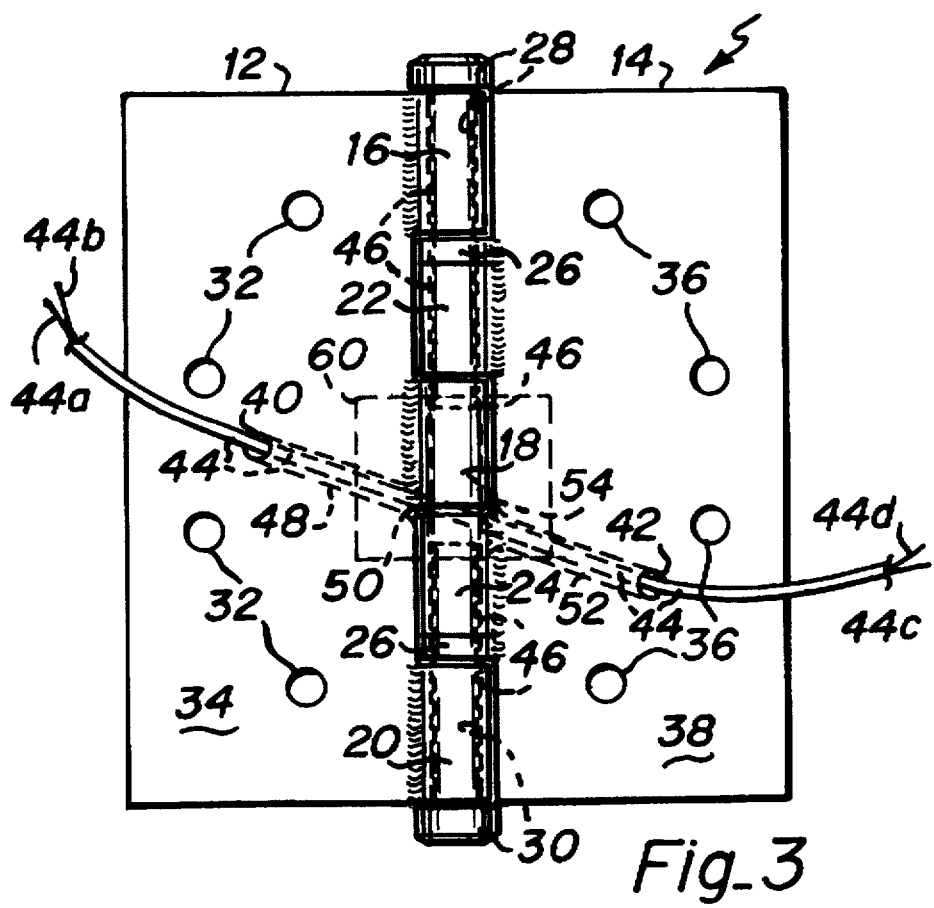
FIG. 3 is an assembled view of the hinge of FIG. 1.

FIG. 3 illustrates a rear view of the power transfer hinge 10 after assembly, showing the first hinge leaf 12, the rear surface 34, the fastening holes 32, the second hinge leaf 14, the rear surface 38, and the fastening holes 36 as described in the detailed description accompanying the FIG. 2 above. The cable 44 is routed through the recess 40, the first passageway 48, the first opening 50, the common bore 46, the second opening 54, the second passageway 52, and the recess 42. The wires 44a–d are attached after the cable is routed. If the cable 44 breaks within the hinge 10, a new cable 44 may be pushed or fished without mechanically disassembling the hinge 10 because the first and second passageways 48 and 52 are aligned and the openings 50 and 54 are tapered as they enter the common bore 46. An outline 60 outlines a portion of the hinge 10 that is illustrated in FIG. 4.

Figure 4:
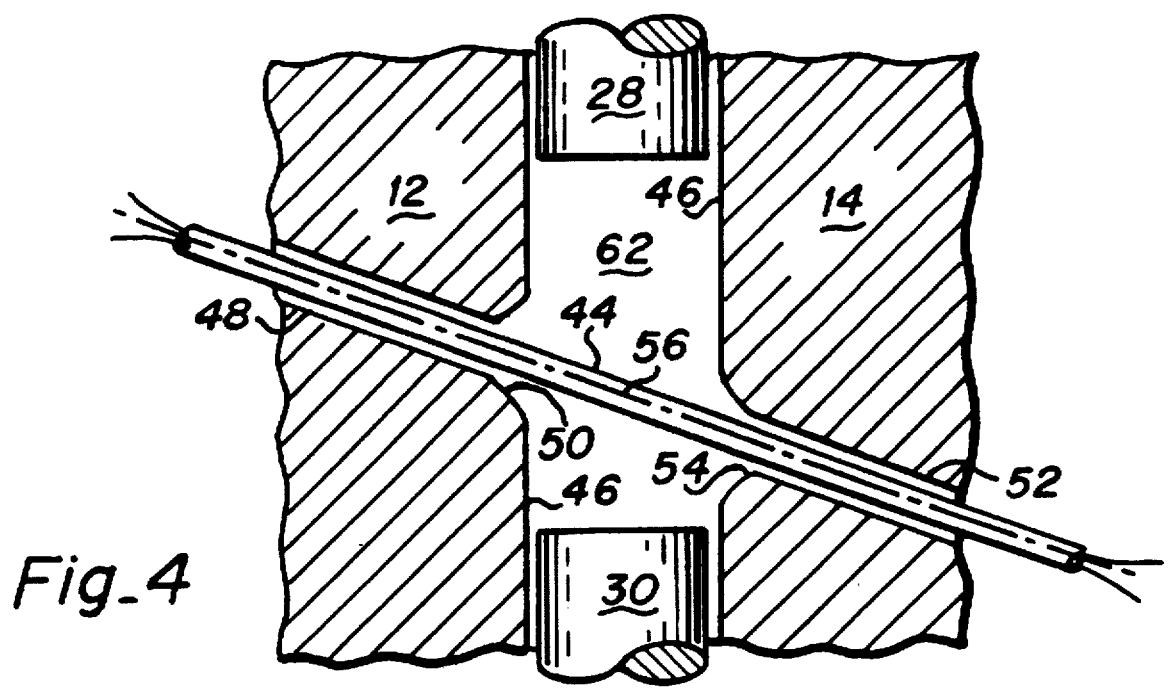
FIG. 4 is a cross-sectional view of an expanded portion of the assembled view of the hinge of FIG. 3.

FIG. 4 illustrates an expanded cross-sectional rear view within the outline 60 (FIG. 3) of the hinge 10 after assembly. The common bore 46 includes a cavity 62 formed between the lower end of the upper pin 28 and the upper end of the lower pin 30. The entries of the first and second passageways 48 and 52 into the cavity 62 are aligned with the common center line 56 and the openings 50 and 54 are tapered to increase in diameter as the passageways 48 and 52 enter the cavity 62. In a preferred embodiment, the hinge leaves 12 and 14 are approximately 0.125' thick, the passageways 48 and 52 are approximately 0.078 inches in diameter, the openings 50 and 54 taper out to a diameter of approximately 0.100 inches, and the cable 44 is 0.071 inches in diameter. It is preferred that the cable 44 be a coaxial electrical cable 44 because for a given insulation thickness, the round cross-section of a coaxial cable 44 provides more cross-sectional area within a round diameter passageway 48 and 52 than individual wires and therefore can carry more current. To facilitate routing, the inner conductor of the coaxial cable 44 is stranded and the outer conductor is braided for greater flexibility, and an outer insulating sleeve coated or made with Teflon. If required in the electrical system, both DC and AC may be simultaneously carded by the cable 44 and separated in the electrical system with a DC blocking capacitor.

Figure 5:
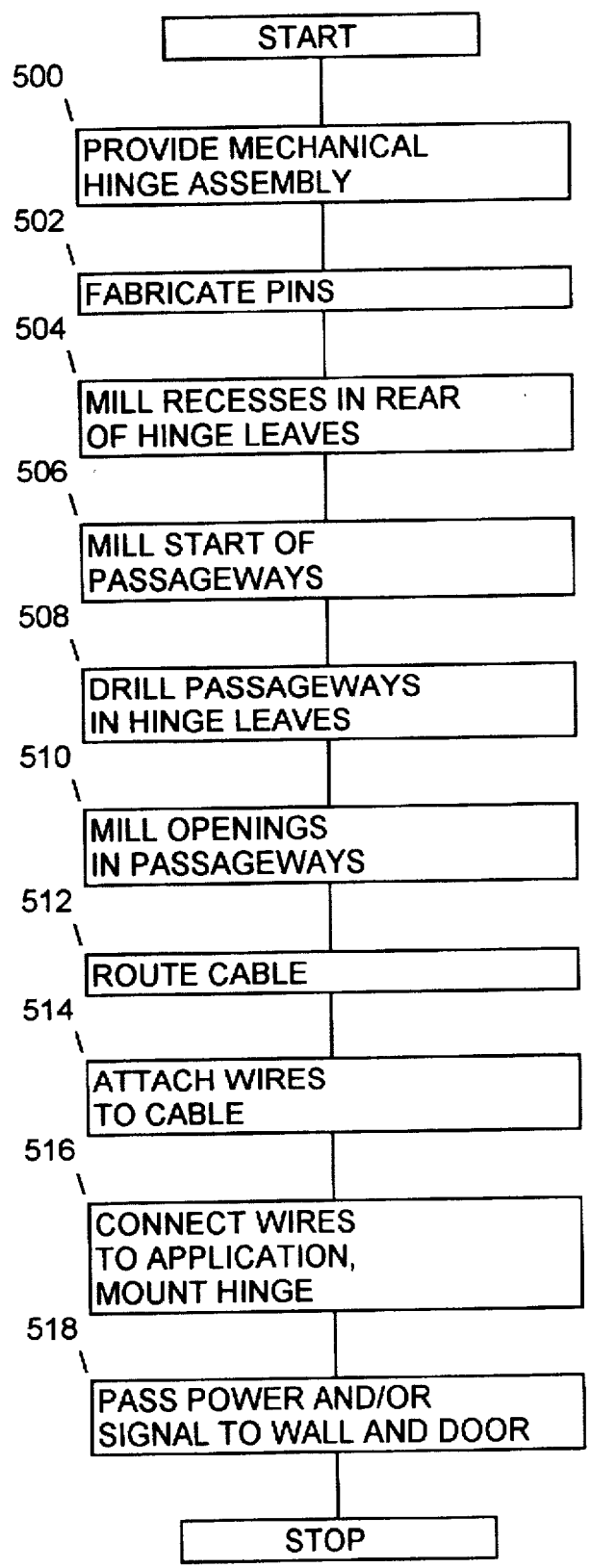
FIG. 5 is a method for constructing the hinge of FIGS. 1–4 for carrying an electrical current from a wall to a door.

FIG. 5 illustrates a preferred method for constructing the power transfer hinge 10. In a step 500, a mechanical hinge assembly such as a model BB5000 from Bommer of Landrun, S.C., a model FBB179 from Stanley Hardware division of The Stanley Works of New Britain, Conn., or a model from Precision Built Butts of Ontario, Calif. is obtained from the manufacturer or a hardware supplier and disassembled. In a step 502 the upper and lower pins 28 and 30 are made from the hinge obtained in the step 500 or fabricated. In a step 504, the recesses 40 and 42 are milled. If desired the recesses 40 and 42 may be located for a Stanley and a McKinney door preparation, respectively. By reversing the upward direction of the hinge 10, either the Stanley or the McKirmey door preparation may be used on the door jamb. Typically, the wall jamb does not have a standard preparation. In a step 506, the passageways 48 and 52 are started with an end mill in order to avoid slipping against the interior surface of the common bore 46. In a step 508, the passageways 48 and 52 are drilled with an ordinary drill bit to connect to the recesses 40 and 42, respectively. In a step 510, the openings 50 and 54 are milled with a tapered mill. Alternatively, the passageways 48 and 52 and the openings 50 and 54 may be drilled with a special drill bit having a tapered shoulder. In a step 512, the cable 44 is routed through the passageways 48 and 52 and the hinge 10 is assembled. In a step 514, the wires 44a–d are connected to the cable 44. In a step 516, the wires 44a–d are connected for an electrical application and the hinge 10 is mounted for bearing the load of a door on a wall. In a step 518, the hinge 10 passes power and/or a signal between the wall and the door.

FIG. 6a illustrates a rear view of a load bearing power transfer hinge referred to herein by the general reference number 610a for pivotally connecting a wall to a door. The hinge 610a includes a right hinge leaf 612a including a first knuckle 616, a third knuckle 618, and a fifth knuckle 620; and a left hinge leaf 614a including a second knuckle 622 and a fourth knuckle 624. The second knuckle 622 is interleaved between the first knuckle 616 and the third knuckle 618, and the fourth knuckle 624 is interleaved between the third 618 and the fifth knuckle 620. The right leaf 612a and the left leaf 614a are pivotally connected by an upper pin 628a and a lower pin 630a. The upper pin 628a has an enlarged head and a pin shaft that inserts downwardly through the bore of the first knuckle 616 and part way into the bore of the second knuckle 622; and the lower pin 630a has an enlarged head and a pin shaft that inserts upwardly through the bore of the fifth knuckle 620, the fourth knuckle 624, and part way into the bore of the third knuckle 618. The upper and lower pins 628a and 630a are capable of bearing a load when the hinge 610a is in operation. The upper pin 628a and the lower pin 630a are staked to the first knuckle 616 and the third knuckle 620, respectively. In operation, the right and left hinge leaves 612a and 614a pivot about the vertical axis of the upper and lower pins 628a and 630a. Fastening holes 632 are used for fastening the rear surface 634 of the right hinge leaf 612a to a door or wall jamb. Similarly, fastening holes 636 are used for fastening the rear surface 638 of the left hinge leaf 614a to an opposed door or wall jamb. The hinge 610a may be used in any orientation including vertically with the upper pin 628a up, vertically with the upper pin 628a down, horizontally, or at an angle. The rear surface 634 of the right hinge leaf 612a includes a recess 640. Similarly, the rear surface 638 of the left hinge leaf 614a includes a recess 642.

When the hinge 610a is assembled, each of the knuckle bores is axially aligned to form a common bore 646. A longitudinal first right passageway 648 enters the common bore 646 through a tapered opening and connects the common bore 646 to the recess 640. Optionally, a longitudinal second right passageway 649 enters the common bore 646 through a tapered opening and connects the common bore 646 to the recess 640. Similarly, a longitudinal first left passageway 652 enters the common bore 646 through a tapered opening and connects the common bore 646 to the recess 642. Optionally, a longitudinal second left passageway 653 enters the common bore 646 through a tapered opening and connects the common bore 646 to the recess 642. The passageways 648 and 652 are made so that then entries into the common bore 646 have a common center line 56 (FIG. 4) when the hinge 610a is assembled. Similarly, the passageways 649 and 653 are made so that their entries into the common bore 646 have a common center line 56 (FIG. 4) when the hinge 610a is assembled. Each of the passageways 648–649 and 652–653 enters the common bore 646 from the inside edge of the hinge leaf 612a and 614a, respectively. Cables 644 and 645 pass through the recess 640, first and second right passageways 648 and 649, the common bore 646, the first and second left passageways 652 and 653, and the recess 642. The use of a common center line 56 (FIG. 4) for each of the pairs of passageways 648/652 and 649/653 enables the cables 644 and 645 to be routed through the hinge 610a after the hinge 610a is assembled without disassembling the hinge 10. Each of the cables 644 and/or 645 may be an electrical coaxial cable, a bundle of electrical wires, preferably four or five, or an optical cable. In a preferred embodiment, the hinge leaves 612a and 614a are approximately 0.125' thick and the passageways 648–653 are approximately 0.070 to 0.090 inches in diameter and spaced by approximately 0.020 inches. Although a preferred embodiment of the load bearing power transfer hinge 610a has five knuckles 616, 618, 620, 622, and 624, any number of knuckles of four or more may be used.

FIG. 6b illustrates a rear view of another embodiment of a power transfer hinge referred to by the general reference number 610b and including a right leaf 612b and an left leaf 614b. Hinge 610b is similar to hinge 610a with the exceptions that hinge 610b includes only a two knuckles 616 and 622; and the upper and lower end caps 628b and 630b replace the upper and lower pins 628a and 630a. In operation the knuckles 616 and 622 are positioned for forming the common bore 646. Cables 644 and 645 pass through the recess 640, first and second right passageways 648 and 649, the common bore 646, the first and second left passageways 652 and 653, and the recess 642. The use of a common center line 56 (FIG. 4) for each of the pairs of passageways 648/652 and 649/653 enables the cables 644 and 645 to be routed through the hinge 610a after the hinge 610a is assembled without disassembling the hinge 10. Each of the cables 644 and/or 645 may be an electrical coaxial cable, a bundle of electrical wires, preferably four or five, or an optical cable. Hinge 610b differs from hinge 610a in that hinge 610b is not side load bearing and the wall and door connected by the hinge 610b must be controlled so that the hinge 610b is not pulled out of alignment. Although a preferred embodiment of the power transfer hinge 610b has two knuckles 616 and 620, any number of knuckles of two or more may be used.

FIG. 7 illustrates a rear view of a lead bearing power transfer hinge of the present invention referred to herein by the general reference number 710 for pivotally connecting a wall and a door. The hinge 710 includes a right hinge leaf 712 including a first knuckle 716 and a third knuckle 718; and a left hinge leaf 714 including a second knuckle 722. The second knuckle 722 is interleaved between the first knuckle 716 and the third knuckle 718. The right leaf 712 and the left leaf 714 are pivotally connected by a lower pin 730. The lower pin 730 has an enlarged head and a shaft that inserts upwardly through a bore in the third knuckle 718 and part way through a bore in the second knuckle 722. An optional upper end cap 728 covers the first knuckle 716. In operation, the right and left hinge leaves 712 and 714 pivot about the vertical axis of the upper end cap 728 and the lower pin 730. The lower pin 730 is capable of bearing a lead when the hinge 710 is operated. Fastening holes 732 are used for fastening the rear surface 734 of the right hinge leaf 712 to a door or wall jamb. Similarly, fastening holes 736 are used for fastening the rear surface 738 of the left hinge leaf 714 to an opposed door or wall jamb. The hinge 710 may be used in any orientation including vertically with the upper end cap 728 up, vertically with the upper end cap 728 down, horizontally, or at an angle. The rear surface 734 of the right hinge leaf 712 includes a recess 740. Similarly, the rear surface 738 of the left hinge leaf 714 includes a recess 742.

When the hinge 710 is assembled, each of the knuckle bores is axially aligned to form a common bore 746. A first right longitudinal passageway 748 enters the common bore 746 through a tapered opening into the common bore 746 connects the common bore 746 to the recess 740. Optionally, a second right longitudinal passageway 749 enters the common bore 746 through a tapered opening and connects the common bore 746 to the recess 740. Similarly, a first left longitudinal passageway 752 having a tapered opening into the common bore 746 connects the common bore 746 to the recess 742. Optionally, a second left longitudinal passageway 753 enters the common bore 746 through a tapered opening and connects the common bore 746 to the recess 742. Each of the passageways 748–749 and 752–753 enters the common bore 746 from the inside edge of the hinge leaf 712 and 714, respectively. Cables 744 passes through the recess 740, the first right passageway 748, the common bore 746, the first left passageways 752, and the recess 742. Optionally, a second cable 745 passes through the recess 740, the second right passageway 749, the common bore 746, the second left passageways 753, and the recess 742. The cables 744 and 745 may be fished after the hinge 710 is assembled by fishing the cables 744 and 745 in each direction from the common bore 746 outwardly to the recesses 740 and 742. Each of the cables 744 and/or 745 may be an electrical coaxial cable, a bundle of electrical wires, preferably four or five, or an optical cable. In a preferred embodiment, the hinge leaves 12 and 14 are approximately 0.125' thick and the passageways 648–653 are approximately 0.070 to 0.090 inches in diameter, and spaced by approximately 0.020 inches. Although a preferred embodiment has three knuckles 716, 718, and 720, a number of knuckles of three or more may be used.

Although the present invention has been described in terms of the presently preferred embodiments, it is to be understood that such disclosure is not to be interpreted as limiting. Various alterations and modifications of the preferred embodiments of the present invention will no doubt become apparent to those skilled in the art after having read the above disclosure. Accordingly, it is intended that the appended claims be interpreted as covering all alterations and modifications as fall within the true spirit and scope of the invention.

What is claimed is:

1. A power transfer hinge comprising:

a right hinge leaf having at least one knuckle;

a left hinge leaf having at least one knuckle axially aligned to a common bore with said knuckle of said right hinge leaf;

at least one right passageway opening into said common bore; and at least one left passageway opening into said common bore, the left passageway having a common center line with the right passageway.

2. The hinge of claim 1, further including:

a cable passing through the left passageway, said common bore, and the right passageway.

3. The hinge of claim 2, further including:

a second cable passing through a second one of the left passageway, said common bore, and a second one of the right passageway.

4. The hinge of claim 2, wherein:

the cable is an electrical coaxial cable.

5. The hinge of claim 2, wherein:

the cable is a wire bundle having at least one electrical wire.

6. The hinge of claim 2, wherein:

the cable is an optical cable.

7. The hinge of claim 5, wherein:

the cable includes five wires.

8. The hinge of claim 1, wherein:

the right hinge leaf includes three of said knuckle; and the left hinge leaf includes two of said knuckle; and further including at least one pin, disposed in said common bore, for pivotally engaging said right and left hinge leaves.

9. The hinge of claim 1, further including:

a right hinge recess in the rear surface of the right hinge leaf, said right hinge recess connecting to the right passageway; and a left hinge recess in the rear surface of the left hinge leaf, said left hinge recess connecting to the left passageway.

10. A method for constructing a hinge for passing power comprising steps of:

providing a hinge having a right hinge leaf having at least one knuckle and a left hinge leaf having at least one knuckle axially aligned to a common bore with said knuckle of said right hinge leaf;

making at least one longitudinal right passageway in said right hinge leaf connecting into said common bore; and making at least one longitudinal left passageway having a common center line with said right passageway in said left hinge leaf connecting into said common bore.

11. The method of claim 10, further including a step of:

routing a cable through said right passageway, said common bore, and said left passageway.

12. The method of claim 11, further including a step of:

routing a second cable through a second said right passageway, said common bore, and a second said left passageway.

13. The method of claim 11, further including a step of:

assembling said right hinge leaf, said left hinge leaf, and a pin for pivotally engaging said right hinge leaf with said left hinge leaf into said hinge; and wherein:

the step of routing a cable further including routing said cable without disassembling said hinge.

14. The method of claim 10, further including a step of:

starting at said common bore, routing a cable from said common bore through said right passageway and from said common bore through said left passageway.

15. The method of claim 14, further including a step of:

starting at said common bore, routing a second cable from said common bore through a second said right passageway and from said common bore through a second said left passageway.

16. The method of claim 14, further including a step of:

assembling said right hinge leaf and said left hinge leaf into said hinge; and wherein:

the step of routing a cable further includes routing said cable without disassembling said hinge.

17. The method of claim 10, wherein:

the step of making at least one right longitudinal passageway includes a step of tapering said passageway to increase the diameter of said passageway at said common bore.

18. The method of claim 10, further including steps of:

making a right hinge recess in the rear surface of the right hinge leaf, and making a left hinge recess in the rear surface of the left hinge leaf; and wherein:

said right hinge recess and said right passageway are connecting; and said right hinge recess and said right passageway are connecting.

19. A power transfer hinge comprising:

a first hinge leaf having an outer knuckle;

a second hinge leaf having at least one knuckle axially aligned to a common bore with said outer knuckle;

at least one first passageway in the first hinge leaf having a first center line opening into said common bore; and at least one second passageway having a second center line opening into said common bore, the second center line and the first center line having an intersection that is one of (i) within said common bore within said outer knuckle and (ii) axially aligned with said common bore outside of said outer knuckle.

20. The hinge of claim 19, further including:

at least one cable for passing through the left passageway, said common bore, and the right passageway.

* * * * *

UNITED STATES PATENT AND TRADEMARK OFFICE
CERTIFICATE OF CORRECTION

PATENT NO.  :  5,727,960
DATED  :  Mar. 17, 1998
INVENTOR(S)  :  Zehrung It is certified that error appears in the above-identified patent and that said Letters Patent is hereby corrected as shown below:

Correct claim 18 to read as described below:
18. The method of claim 10, further including steps of:
making a right hinge recess in the rear surface of the right hinge leaf; and
making a left hinge recess in the rear surface of the left hinge leaf; and wherein:
said right hinge recess and said right passageway are connecting; and
said left hinge recess and said left passageway are connecting.

Signed and Sealed this

Fourth Day of April, 2000

Attest:

Q. TODD DICKINSON

*Attesting Officer*  *Director of Patents and Trademarks*